United States Patent [19]
McDaniel et al.

[11] Patent Number: 6,077,978
[45] Date of Patent: *Jun. 20, 2000

[54] DIRECT POLYOXYALKYLATION OF GLYCERINE WITH DOUBLE METAL CYANIDE CATALYSIS

[75] Inventors: Kenneth G. McDaniel, West Chester, Pa.; Mark J. Perry, Hurricane, W. Va.; John E. Hayes, Gouvieux, France

[73] Assignee: ARCO Chemical Technology L.P., Greenville, Tenn.

[*] Notice: This patent is subject to a terminal disclaimer.

[21] Appl. No.: 08/932,613

[22] Filed: Sep. 17, 1997

[51] Int. Cl.$^7$ .................................................... C07C 43/11
[52] U.S. Cl. ............................................................ 568/620
[58] Field of Search ............................................. 568/620

[56] References Cited

U.S. PATENT DOCUMENTS 2,578,816  12/1951  Lofdahl .................................. 260/637
5,391,722   2/1995  Chandalia ............................. 536/18.6
5,689,012  11/1997  Pazos .................................... 568/619
5,777,177   7/1998  Pazos .................................... 568/679

OTHER PUBLICATIONS

"Kirk–Othmer Encyclopedia of Chemical Technology," 4th Ed., vol. 12, pp.681–594, 1994.

*Primary Examiner*—Michael L. Shippen
*Attorney, Agent, or Firm*—Brooks & Kushman P.C.

[57] ABSTRACT

Acidification, neutralization, or removal of basic impurities from acid sensitive low molecular weight starter or acidification of a reactor heel prior to addition of acid sensitive low molecular weight starter allows direct oxyalkylation of continuously added acid sensitive low molecular weight starter to produce polyoxyalkylene acid sensitive low molecular weight starter-initiated or co-initiated polyols in the presence of a double metal cyanide catalyst. The preferred acid sensitive low molecular weight starter is glycerine.

27 Claims, 1 Drawing Sheet

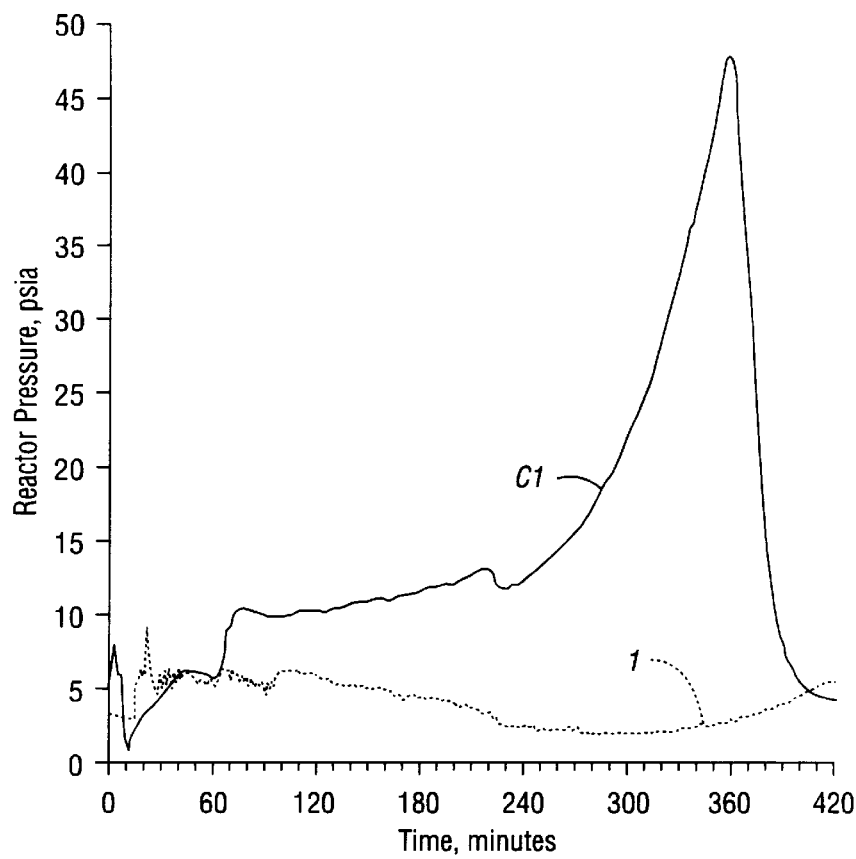
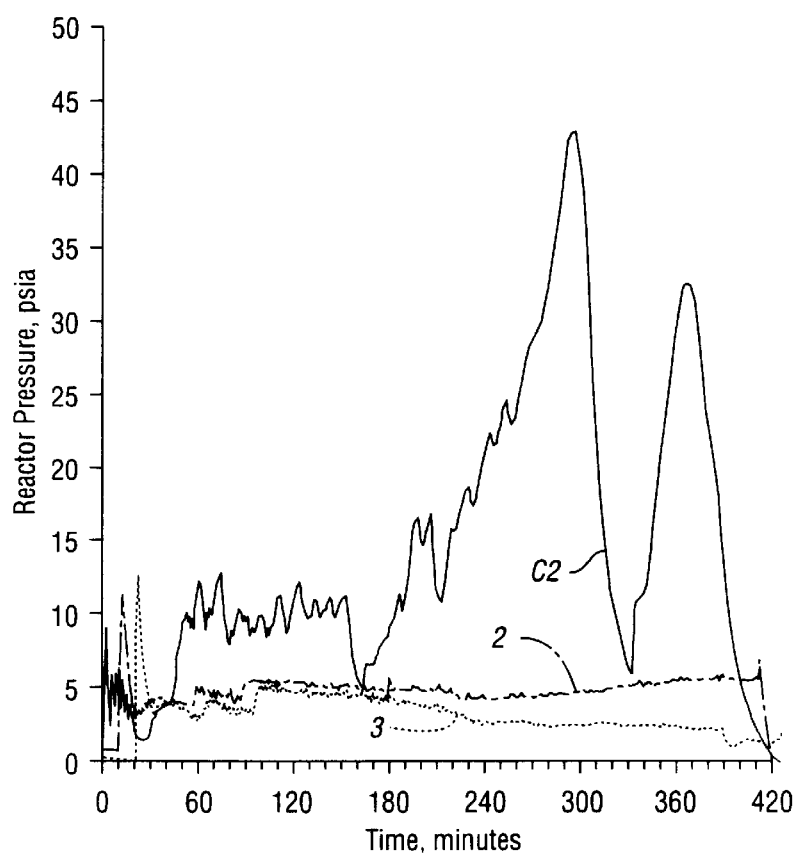

DIRECT POLYOXYALKYLATION OF GLYCERINE WITH DOUBLE METAL CYANIDE CATALYSIS

TECHNICAL FIELD

The present invention pertains to preparation of polyoxyalkylene polyols by the direct oxyalkylation of glycerine and other oxyalkylatable low molecular weight initiator molecules by means of double metal cyanide catalysis.

BACKGROUND ART

Base-catalyzed oxyalkylation has been used to prepare polyoxyalkylene polyols for many years. In base catalyzed oxyalkylation, a suitably hydric low molecular weight starter molecule such as propylene glycol or glycerine is oxyalkylated with alkylene oxide, for example ethylene oxide or propylene oxide, to form a polyoxyalkylene polyether polyol product. Because it is possible to employ a low molecular weight starter, the build ratio (polyol weight/starter weight) is relatively high, and thus the process effectively utilizes reactor capacity. Strongly basic catalysts such as sodium hydroxide or potassium hydroxide are used in these base-catalyzed oxyalkylations.

However, the bulk of polyoxyalkylene polyols useful in synthesis of polyurethane polymers as well as those suitable for other uses, contain substantial amounts of oxypropylene moieties. During base-catalyzed oxypropylation, a competing rearrangement of propylene oxide to allyl alcohol generates monofunctional species which also become oxyalkylated, producing a wide range of polyoxyalkylene monols with molecular weights ranging from that of allyl alcohol itself or its low molecular weight oxyalkylated oligomers to polyether monols of very high molecular weight. In addition to broadening the molecular weight distribution of the product, the continuous generation of monols lowers the product functionality. For example, a polyoxypropylene diol or triol of 2000 Da equivalent weight may contain from 30 to 40 mol percent monol. The monol content lowers the functionality of the polyoxypropylene diols produced from their "nominal," or "theoretical" functionality of 2.0 to "actual" functionalities in the range of 1.6 to 1.7. In the case of triols, the functionality may range from 2.2 to 2.4. As the oxypropylation proceeds further, the functionality continues to decrease, and the molecular weight growth rate slows. For these reasons, the upper practical limit for base-catalyzed polyoxypropylene polyol equivalent weight is just above 2000 Da. Even at these modest equivalent weights, the products are characterized by low actual functionality and broad molecular weight distribution.

The monol content of polyoxyalkylene polyols is generally determined by measuring the unsaturation, for example by ASTM D-2849-69, "Testing of Urethane Foam Polyol Raw Materials", as each monol molecule contains allylic termination. Levels of unsaturation of about 0.060 meq/g to in excess of 0.10 meq/g for based-catalyzed polyols such as those just described are generally obtained. Numerous attempts have been made to lower unsaturation, and hence monol content, but few have been successful.

In the early 1960's, double metal cyanide complexes such as the non-stoichiometric glyme complexes of zinc hexacyanocobaltate were found to be able to prepare polyoxypropylene polyols with low monol contents, as reflected by unsaturation in the range of 0.018 to 0.020 meq/g, a considerable improvement over the monol content obtainable by base catalysis. However, the catalyst activity, coupled with catalyst cost and the difficulty of removing catalyst residues from the polyol product, prevented commercialization. In the 1980's, interest in such catalysts resurfaced, and improved catalysts with higher activity coupled with improved methods of catalyst removal allowed commercialization for a short time. The polyols also exhibited somewhat lower monol content, as reflected by unsaturations in the range of 0.015 to 0.018 meq/g. However, the economics of the process were marginal, and in many cases, improvements expected in polymer products due to higher functionality and higher polyol molecular weight did not materialize.

Recently, researchers at the ARCO Chemical Company developed double metal cyanide complex catalysts ("DMC" catalysts) with far greater activity than ever before.

These catalysts, as disclosed in U.S. Pat. Nos. 5,470,813 and 5,482,908, incorporated herein, have again allowed commercialization under the tradename ACCLAIM™ polyether polyols. However, unlike the low unsaturation (0.015–0.018 meq/g) polyols prepared by prior DMC catalysts, the new, ultra-low unsaturation polyols often demonstrate dramatic improvements in polymer properties, although formulations are often different from the formulations useful with conventional polyols. These polyols typically have unsaturation in the range of 0.002 to 0.008 meq/g.

One of the drawbacks of DMC catalyzed oxyalkylation is the difficulty of using low molecular weight starters in polyether synthesis. Polyoxyalkylation of low molecular weight starters is generally sluggish, and often accompanied by catalyst deactivation. Thus, rather than employing low molecular weight starter molecules directly, oligomeric starters are prepared in a separate process by base catalyzed oxypropylation of a low molecular weight starter to equivalent weights in the range of 200 Da to 700 Da or higher. Further oxyalkylation to the target molecular weight takes place in the presence of DMC catalysts However, strong bases deactivate DMC catalysts. Thus, the basic catalyst used in oligomeric starter preparation must be removed by methods such as neutralization, adsorption, ion exchange, and the like. Several such methods require prolonged filtration of viscous polyol. The additional steps associated with catalyst removal from the oligomeric starter add significant process time and cost to the overall process. Furthermore, the higher molecular weight of the starter lowers the build ratio of the process significantly, thus decreasing reactor utilization.

A further observation connected with oxyalkylation with DMC catalysts is that a very high molecular weight component is generally observed. The bulk of DMC catalyzed polyol product molecules are contained in a relatively narrow molecular weight band, and thus DMC-catalyzed polyols exhibit very low polydispersities, generally 1.20 or less. However, it has recently been discovered that a very small fraction of molecules, i.e. less than 1000 ppm, have molecular weights in excess of 100,000 Da. This very small but very high molecular weight fraction is thought to be responsible for some of the anomalous properties observed with ultra-low unsaturation, high functionality polyols. These ultra high molecular weight molecules do not significantly alter the polydispersity, however, due to the extremely small amounts present.

In copending U.S. patent application Ser. Nos. 08/597,781 and 08/683,356, herein incorporated by reference, it is disclosed that the high molecular weight "tail" in polyoxypropylene polyols may be minimized by continuous addition of starter during oxyalkylation. In batch and semi-batch processes, low molecular weight starter, e.g., propylene glycol or dipropylene glycol, is added continuously as the polyoxyalkylation proceeds rather than all being added at the onset. The continued presence of low molecular weight species has been found to lower the amount of high molecular weight tail produced, while also increasing the build ratio, since a large proportion of the final polyol product is derived from low molecular weight starter itself. Surprisingly, the polydispersity remains low, contrary to an expected large broadening of molecular weight distribution. In the continuous addition process, continuous addition of starter during continuous rather than batch production was found to also result in less low molecular weight tail, while allowing a build ratio which approaches that formerly obtainable only by traditional semi-batch processing employing base catalysis.

Unfortunately, it has been observed that when glycerine, a widely used trifunctional starter, is employed in either the batch-type continuous addition of starter process, or the continuous-type continuous addition of starter process, the DMC catalyst gradually deactivates, and often a polyether of the desired molecular weight cannot be obtained, or when obtained, product characteristics such as amount of high molecular weight tail, polydispersity, etc., are less than optimal. This has been found to be the case even when the glycerine addition is relatively slow, but is exacerbated when the glycerine addition rate is increased, as may happen during commercial production by normal or abnormal process excursions, pump failure, and the like.

It would be desirable to be able to utilize low molecular weight starter molecules for polyol production using DMC catalysis. It would further be desirable to prepare DMC-catalyzed polyols with minimal high molecular weight tail components. It would be further desirable to prepare polyoxyalkylation polyols in high build ratios. However, these objectives cannot be met if catalyst deactivation occurs.

SUMMARY OF THE INVENTION

The present invention pertains to a process for the preparation of polyoxyalkylene polyols by the DMC-catalyzed oxypropylation of glycerine and other low molecular weight initiator molecules by continuous addition of the low molecular weight initiator in either a continuous or batch process. It has been surprisingly and unexpectedly discovered that continuous and batch processes involving continuous addition of starter may be practiced without deactivation, if the low molecular weight starter, or alternatively, the reactor heel, as hereinafter defined, are treated so as to remove or deactivate traces of residual bases which accumulate during synthesis or handling of certain low molecular weight starters, particularly glycerine.

BRIEF DESCRIPTION OF THE DRAWINGS

FIG. 1 is a plot of propylene oxide pressure versus time for two glycerine oxypropylations employing DMC catalysis, one employing acidified glycerine, the other employing non-acidified glycerine.

FIG. 2 is a plot of propylene oxide pressure versus time for two acidified glycerine runs, and a run employing no acid.

DETAILED DESCRIPTION OF THE PREFERRED EMBODIMENTS

The subject process involves the continuous addition of low molecular weight starter to an oxyalkylation employing double metal cyanide catalysts as the oxyalkylation catalyst. The process may be conducted as a semi-batch process or as a continuous addition process. In either case, either the low molecular weight starter feed, the process heel, or other process stream is acidified such that the level of basic impurities are less than an amount effective to decrease catalyst activity. The required amount of acid is generally in the low ppm range relative to the weight of low molecular weight starter.

In the subject invention process, polyoxyalkylene polyols are prepared by oxyalkylation of one or more suitably hydric low molecular weight initiators, preferably glycerine, in the presence of a double metal cyanide complex catalyst (DMC catalyst) In conventional batch processes employing DMC catalysts, the entire initiator (starter) is added initially to the reactor, DMC catalyst added, and a small percentage of the alkylene oxide feed added. A significant pressure drop signifies that the catalyst has been activated. Alternatively, a preactivated master batch of catalyst mixed with initiator may be used. The reactor temperature is generally maintained at temperatures between 70° C. and 150° C., and the remainder of propylene oxide added at relatively low pressure, i.e. less than 10 psig. In the conventional process, oligomeric starters having an equivalent weights in the range of 200–700 Da or higher are generally used. For glycerine polyols, for example, molecular weights of 700 Da to 1500 Da are preferred. Equivalent weights and molecular weights herein in Da (Daltons) are number average equivalent weights and molecular weights unless indicated otherwise.

In the conventional process, by way of example, the preparation of a 3000 Da molecular weight polyoxypropylated glycerine triol may be achieved through oxypropylation of a 1500 Da molecular weight oligomeric oxypropylated glycerine starter until a molecular weight of 3000 Da is achieved. The build ratio is 3000 Da/1500 Da or 2.0. This low build ratio cannot efficiently take advantage of reactor capacity, as some 40 percent of the total reactor capacity is used for starter alone. In addition, the product will have a small, but significant amount of a very high molecular weight (>100,000 Da) fraction. This high molecular weight fraction ("tail") is believed to contribute to foam collapse in some polyurethane systems.

In the continuous addition of starter process, polyoxyalkylation is accomplished by addition of a smaller amount of oligomeric starter together with catalyst and initial alkylene oxide for activation as in the conventional process. However, in the continuous addition of starter process, low molecular weight starter is added in addition to alkylene oxide, preferably as a mixed reactor feed stream. The amount may be 1.8 weight percent based on the weight of the combined low molecular weight starter/alkylene oxide stream, as a non-limiting example. As a result of the use of lesser amounts of oligomeric starter and continuous introduction of low molecular weight "monomeric" starter, a glycerine polyol of 3000 Da molecular weight may be prepared at higher build ratios, for example, a build ratio of 5. The process efficiency is increased by approximately 100 percent based on propylene oxide usage. The product also exhibits less high molecular weight tail.

The continuous addition of starter process just described works well with low molecular weight starters such as propylene glycol and dipropylene glycol. However, when glycerine, a common trihydric starter, is used in the continuous addition of starter process, the catalyst often partially or fully deactivates, as shown by an increase in propylene oxide pressure in the reactor. The reaction slows or substantially ceases, and the product may not reach the desired molecular weight. Products are found to have broad polydispersities, and a relatively higher amount of high molecular weight tail.

It has now been surprisingly discovered that addition of very small amounts of acid to the glycerine initiator prior to its introduction into the reactor as continuously added starter allows use of glycerine to produce polyols of high molecular weight without catalyst deactivation, without increasing the amount of high molecular weight tail or increasing polyol polydispersity. The same, or sometimes superior results may be obtained by acidifying the reactor heel rather than glycerine. Without wishing to be bound by any particular theory, it is believed that glycerine may contain basic impurities associated with its manner of production, which is generally by the base-catalyzed hydrolysis of triglycerides derived from animal fats or vegetable oils. It is known that bases deactivate DMC catalysts. Thus, addition of acid is a preferable manner of preventing deactivation of DMC catalysts during oxyalkylation of glycerine DMC catalysis. Other methods of elimination of basic substances or other acid-reactive substances from glycerine so as to prevent catalyst deactivation include adsorption by acid adsorbents, or by ion-exchange to either neutralize the impurities or to exchange them for acidic moieties. The preferred method of elimination of basic substances is by addition of acid.

Low molecular weight starters useful in the present process include those having molecular weights below about 400 Da, preferably below 300 Da, which contain basic, DMC catalyst-deactivating impurities. Non-limiting examples of such low molecular weight starter molecules include glycerine, diglycerol, and polyglycerol, all of which are generally prepared through the use of strong bases. Glycerine is generally obtained by the hydrolysis, or "saponification" of triglycerides, while diglycerol and polyglycerol may be obtained by base-catalyzed condensation of glycerine. Further examples of suitable low molecular weight starter molecules include various methylolated phenols and similar products prepared by the base-catalyzed reaction of formaldehyde with urea, phenol, cresol, and the like.

The suitability of a particular low molecular weight starter for use in the present invention may be ascertained by polyoxypropylating non-acidified (and "non-treated" as described below) starter employing DMC catalysis and normal polyoxyalkylation conditions, e.g., at 110–120° C. and 10 psig propylene oxide pressure. An oligomeric starter, preferably one which has been itself prepared by DMC catalysis, or which has been carefully refined to remove basic catalyst residues is introduced into the reactor, the DMC catalyst added and activated as described herein and in the aforementioned patents, and the proposed starter added slowly to the reactor as polyoxypropylation proceeds, either admixed with alkylene oxide, as a separate reactant stream, or admixed with another stream, for example, a product recycle stream.

If the alkylene oxide pressure rises to a high level, indicating that catalyst deactivation has occurred, then the low molecular weight starter should be retested following base removal/neutralization of the low molecular weight starter. For example, the proposed starter may be acidified as described herein, or treated with an acidic ion exchange resin or other base removal method, i.e., contact with a base-reactive substance such as phosgene or thionyl chloride. Alternatively, the reactor "heel," i.e., the oligomeric starter mixture used to initiate the reaction may be acidified. If the same low molecular weight starter is the oxyalkylatable without premature catalyst deactivation after having been acidified or otherwise "treated" as described herein, then the low molecular weight starter is an "acid sensitive" starter as that term is used herein.

Acids useful in neutralization include the mineral acids and the organic carboxylic acids, phosphonic acids, sulfonic acids, and other acids. Phosphoric acid is preferred as a mineral acid during oxyalkylation of glycerine, while citric acid and 1,3,5-benzene tricarboxylic acids may be useful as organic acids. Acid derivatives which are reactive with bases, such as acid chlorides and acid anhydrides and the like, are also useful. Organic acids such as phosphonic acids, sulfonic acids, e.g. p-toluenesulfonic acid, and the like, may also be used. Examples of mineral acids which are suitable include hydrochloric acid, hydrobromic acid, and sulfuric acid, among others, while useful carboxylic acids or their acidifying derivatives include formic acid, oxalic acid, citric acid, acetic acid, maleic acid, maleic anhydride, succinic acid, succinic anhydride, adipic acid, adipoyl chloride, adipic anhydride, and the like. Inorganic acid precursors such as thionyl chloride, phosphorous trichloride, carbonyl chloride, sulfur trioxide, thionyl chloride phosphorus pentoxide, phosphorous oxytrichloride, and the like are considered as mineral acids herein. These lists are illustrative and not limiting.

Adsorbents which may be used are non-basic adsorbents, i.e. adsorbents which will adsorb basic substances and not leave appreciable residues derived from the adsorbent itself into the polyol. Examples of adsorbents include activated carbon, magnesium silicate, acid alumina, acid silica, and the like. Enough adsorbent must be used to remove the basic impurities. With some adsorbents, e.g. activated carbon, the amount required may be prohibitive, although lesser amounts can be utilized in conjunction with other treatments. Whether an amount consistent with the purpose of the invention has been used can be verified by the test for low molecular weight starter deactivating activity as herein described.

Ion exchange resins suitable are preferably acid type ion exchange resins which are regenerated by washing the resin with strong acid between uses. For example, acrylic and styrenic resins with sulfonate, phosphonate, or carboxylate groups, preferably in their acid form, may be used. Suitable resins are commercially available, for example from Rohm and Haas and from Dow Chemical. The low molecular weight starter may be agitated with the adsorbent or ion exchange resin and filtered, or preferably may be passed through an adsorbent or resin packed column.

Preferably, however, an acid, more preferably a common mineral acid, is simply added to the glycerine and stirred. The glycerine, following the addition, is preferably stripped to remove traces of water which may be introduced with the acid or generated as a result of neutralization by the acid. Addition of acid is a preferable means of operation as it is inexpensive and rapid, and does not use any special techniques. In general, less than 100 ppm acid based on total low molecular weight starter need be added, preferably about 5 ppm to 50 ppm, and most preferably about 10 ppm to 30 ppm.

By "continuous addition of starter" relative to the subject process is meant oxyalkylation in the presence of a DMC catalyst where a low molecular weight starter or a low molecular weight oligomeric oxyalkylation product thereof having a molecular weight of less than about 400 Da, preferably less than 300 Da, and most preferably less than 200 Da, is added substantially continuously throughout a substantial portion of the oxyalkylation such that the reaction mixture contains a small portion of low molecular weight starter throughout the bulk of the oxyalkylation. In general, about 30 weight percent of the final polyether product will have been derived from the low molecular weight initiator rather than the higher molecular weight oligomeric starter, more preferably in excess of 50 weight percent, and most preferably 70 weight percent or more.

The low molecular weight, "acid sensitive" starter may be mixed with non-acid sensitive starters as well, e.g. ethylene glycol, propylene glycol, dipropylene glycol, trimethylolpropane, pentaerythritol, sorbitol, sucrose, and the like, to produce co-initiated polyether polyols. Reactions where an acid sensitive starter or a lower oligomer are added all at once to the reactor is not a "continuous addition of starter" process. However, it must be understood that a final portion of oxyalkylation may, if desired, be conducted without addition of low molecular weight starter. This "finishing" step allows for reduction of moderate molecular weight oligomers by providing sufficient reaction time for the last added low molecular weight starter to be oxyalkylated to a high molecular weight, thus minimizing polydispersity.

In the continuous version of the continuous addition of starter process, the reaction may be initiated by use of an oligomeric starter, but once begun is continuously initiated by further oligomeric starter, preferably by recycle of an oligomer or polymer from a later stage of the reaction. Alkylene oxide together with glycerine or low molecular weight oxyalkylation product is added at various points along the reactor which may, for example, be a tubular reactor ("multi-point addition"). A continuous stirred tank reactor (CSTR) may also be used.

In either the batch or continuous versions of the continuous addition of starter process, a "heel" may be used to initiate the reaction. This heel, in the case of a batch reaction, may be an oligomeric product prepared separately by DMC catalysis or other catalytic methods, may be an intermediate molecular weight takeoff from a batch reactor which is stored for later use, or may be a portion of fully oxyalkylated product. The unique nature of the continuous addition of starter process allows use of target weight product polyols as the heel without appreciably broadening molecular weight distribution of the product. Apparently, the rate of oxyalkylation of oxyalkylatable species is inversely proportional to the molecular weight or degree of oxyalkylation of the oxyalkylatable species, and thus low molecular weight species are oxyalkylated much more rapidly than higher molecular weight species.

For the continuous process, a heel may be used from a separate storage tank as in the batch process, but to take full advantage of the fully continuous process, the heel is provided by a recycle takeoff from an intermediate or final product stream. In this manner, build ratios approaching those of base catalyzed batch oxyalkylations employing monomeric starters such as glycerine may be achieved after continuous runs of several days duration.

Rather than treat the glycerine to acidify it or to remove basic impurities, the heel used in the process may be acidified. In such case, to the heel should generally be added an amount of acid equivalent to that which would be added mixed with glycerine. In the batch process, the entire amount of acid may be added conveniently at the beginning of the reaction, although it may be added in increments as well. In the continuous process, the addition of acid and its frequency of addition may be adjusted depending upon the amount and type of recycle and the intermixing characteristics of the reactor. For example, with plug flow reactors, it may be most desirable to add acid continuously to the heel.

Having generally described this invention, a further understanding can be obtained by reference to certain specific examples which are provided herein for purposes of illustration only and are not intended to be limiting unless otherwise specified.

Critical Foam Formulation Testing

The presence or absence of a deleterious high molecular weight tail in a polyoxypropylene polyol used in polyurethane foams may be assessed by employing the polyol in a highly stressed hand-mixed foam formulation. In this test, a foam prepared from a given polyol is reported as "settled" if the foam surface appears convex after blow-off and is reported as collapsed if the foam surface is concave after blow-off. The amount of collapse can be reported in a relatively quantitative manner by calculating the percentage change in a cross-sectional area taken across the foam. The foam formulation is as follows: polyol, 100 parts; water, 6.5 parts; methylene chloride, 15 parts; Niax® A-1 amine-type catalyst, 0.03 parts; T-9 tin catalyst, 0.4 parts; L-550 polysiloxane surfactant, 0.5 parts. The foam is reacted with a mixture of 2,4- and 2,6-toluenediisocyanate at an index of 110. The foam may be conveniently poured into a standard 1 cubic foot cake box, or a standard 1 gallon ice cream container. In this formulation, conventionally prepared, i.e. base catalyzed polyols having high secondary hydroxyl cause the foam to settle approximately 5–10%, whereas polyols prepared from DMC catalysts exhibiting high molecular weight tails as disclosed in the present invention, cause the foam to "collapse", by settling approximately 40–70% or more.

Analytical Procedure for Determining High Molecular Weight Tail

The analytical procedure useful for obtaining the quantity of high molecular weight tail in a given DMC catalyzed polyol is a conventional HPLC technique, which can easily be developed by one skilled in the art. The molecular weight of the high molecular weight fraction may be estimated by comparing its elution time from the GPC column with that of a polystyrene standard of appropriate molecular weight. For example, a polystyrene of 100,000 molecular weight has been found appropriate for most analyses As is known, the high molecular weight fraction elutes from the column more rapidly than lower molecular weight fractions, and to aid in maintaining a stable baseline, it is appropriate following the elution of the high molecular weight fraction, to divert the remainder of the HPLC eluate to waste, rather than allowing it to pass through the detector, overloading the latter. Although many suitable detectors may be utilized, a convenient detector is an evaporative light scattering detector such as those commercially available.

In the preferred analysis method, a Jordi Gel DVB $10^3$ angstrom column, 10×250 mm, 5 micron particle size is employed together with a mobile phase which consists of tetrahydrofuran flowing at a rate of 1.0 milliliters per minute. The detector used is a Varex Model IIA evaporative light scattering detector with a detector heater temperature set at 100° C. and exhaust temperature of 60° C., with a nitrogen flow of 40 milliliters per minute. Polystyrene stock solutions are made of a 591,000 molecular weight polystyrene by weighing 20 milligrams into a 100 milliliter volumetric flask and diluting to the mark with tetrahydrofuran. This stock solution was utilized to prepare quantitative standards containing 2, 5, and 10 mg/L of polystyrene. A molecular weight calibration standard was prepared by weighing out 2 milligrams of 100,000 molecular weight polystyrene into a 100 milliliter volumetric flask and dissolving and diluting to the mark with tetrahydrofuran.

Polyol samples were prepared by weighing 0.1 gram of polyether into a 1 ounce bottle, and adding tetrahydrofuran to the sample to bring the total weight of sample and tetrahydrofuran to 10.0 grams. The peak areas for the polystyrene standards are electronically integrated, and peaks for each candidate polyol are averaged. The average peak areas are used to plot the log of peak areas versus log of peak concentrations. The concentration of greater than 100,000 Da molecular weight polymer in the polyol sample in ppm may be given by the equation:

$$\text{Concentration}_{ppm} = [(\text{Concentration}_{mg/L})(W_t/W_s)]/0.888,$$

where Concentration$_{mg/L}$ is equal to the concentration of polymer in milligrams per liter, $W_t$ equals the total weight of sample plus solvent, $W_s$ equals the weight of sample, and 0.888 is the density of tetrahydrofuran. For example, if the concentration of the greater than 100,000 Da molecular weight polymer fraction determined by the analysis is 1.8 mg/L, and the concentration factor ($W_t/W_s$) is 100, and the concentration$_{ppm}$ is 203 ppm.

EXAMPLES 1, 2, AND 3, COMPARATIVE EXAMPLES C1 and C2

A series of oxypropylations employing continuous addition of starter were performed in 10 gallon and 300 gallon reactors. In each case, an amount of 1500 Da molecular weight oxypropylated glycerine starter sufficient to provide a build ration of 5 was introduced into the reactor together with an amount of zinc hexacyanocobaltate complex DMC catalyst sufficient to provide a final catalyst concentration of 30 ppm in the final product. The 1500 Da oligomeric starters are identified as second or third generation starters (two or three runs removed from KOH refined starter). Commercial glycerine was utilized.

Following addition of oligomeric starter and catalyst, the reactor was stripped with a nitrogen sparge at a pressure of 5–30 mm Hg for 30–40 minutes and a reactor temperature of 130° C. Propylene oxide or a mixture of propylene oxide and ethylene oxide was introduced in an amount equivalent to 4–6 weight percent of the starter charge and the reactor pressure monitored to ensure catalyst activation had occurred.

Pressure was allowed to drop to below 500 torr prior to restarting propylene oxide feed. Following activation, propylene oxide in a "red hot" build ratio was added to the reactor The "red hot" build ratio is defined as the ratio of the amount of propylene oxide added plus the initial starter weight to the initial starter weight.

The "red hot" build ratio is necessary to ensure the catalyst is fully activated. After completing addition to the "red hot", build ratio, the remaining propylene oxide, containing 2.3–2.6 weight percent glycerine, was added continuously over a 6–6.5 hour period. The mixed glycerine/propylene oxide feed was continued to the end of the reaction. In some examples, glycerine, propylene oxide and ethylene oxide were co-fed.

The hydroxyl number, unsaturation, and viscosity of each polyol were measured in accordance with standard methods. The polyol molecular weight distribution and polydispersity were measured and calculated by standard gel permeation chromatography techniques. Results are presented in Table 1 and 2. The amount of high molecular weight tail is measured by gel permeation chromatography as well.

TABLE 1

| Example | 1 | C1 |
|---|---|---|
| Target Mol. Wt. (Da) | 3000 | 3000 |
| Target OH # | 56 | 56 |
| Initial Starter Mol. Wt. (Da) | 1500 | 1500 |
| Initial Starter Generation | 3rd generation | 2nd generation |
| Continuous Starter | glycerine | glycerine |
| Build Ratio | 5 | 5 |
| Red Hot Build Ratio | 1.5 | 1.5 |
| Glycerine Conc. % (glyc/(PO + glyc)) | 2.6 | 2.6 |
| Final Catalyst in Product (ppm) | 30 | 30 |
| Agitation (bhp/Mgal) | 8 | 8 |
| Phosphoric Acid in Starter (ppm) | 20 | 0 |
| Stripping Pressure (mmHg) | 30 | 5 |
| Stripping Temperature (° C.) | 130 | 130 |
| Stripping Time (min) | 40 | 36 |
| Catalyst Activation Charge (Oxide/Starter) wt. % | 5.5 | 6 |
| Feed time (hr) | 6.5 | 6 |
| Measured OH # | 54.7 | 68.2 |
| HMW Tail (ppm) | 444 | 568 |
| Critical Foam Test | pass | fail |
| Unsaturation (meq/g) | 0.0037 | 0.0035 |
| Viscosity (cst) | 624 | 573 |
| Polydispersity | 1.11 | 1.75 |

TABLE 2

| Example | 2 | C3 | C2 |
|---|---|---|---|
| Target Mol. wt. (Da) | 3200 | 3200 | 3200 |
| Target OH # | 52 | 52 | 52 |
| Initial Starter Mol. Wt. (Da) | 1500 | 1500 | 1500 |
| Initial Starter Generation | 3rd generation | 3rd generation | 2nd generation |
| Continuous Starter | glycerine | glycerine | glycerine |
| Build Ratio | 5 | 5 | 5 |
| Red Hot Build Ratio | 1.5 | 1.5 | 1.5 |
| Glycerine Conc. % (glyc/(PO + glyc)) | 2.3 | 2.5 | 2.3 |
| Final Catalyst in Product (ppm) | 30 | 30 | 30 |
| Agitation (bhp/Mgal) | 8 | 8 | 8 |
| Phosphoric Acid in Starter (ppm) | 20 | 20 | 0 |
| Stripping Pressure (mmHg) | 30 | 30 | 10 |
| Stripping Temperature (° C.) | 130 | 130 | 130 |
| Stripping Time (min) | 40 | 40 | 30 |
| Catalyst Activation Charge (Oxide/Starter) wt. % | 5.5 PO/EO | 5.5 PO/EO | 4 PO |
| Feed time (hr) | 6.5 | 6.5 | 6 |
| Measured OH # | 51.3 | 49.9 | 67.0 |
| Unsaturation (meq/g) | 0.0029 | 0.0026 | 0.0032 |
| Viscosity (cst) | 651 | 665 | 554 |
| Polydispersity | 1.12 | 1.12 | 1.31 |
| % EO | 12 | 12.3 | 12.4 |

In Examples 1, 2 and 3, the glycerine co-fed with propylene oxide was acidified prior to its admixture with propylene oxide by addition of 20 ppm phosphoric acid. In Comparative Examples C1 and C2, no acidification was performed. The propylene oxide pressure during the five runs were plotted against time, and the plots illustrated in FIGS. 1 and 2.

In the Figures, the plots are labeled consistent with the Examples. In plots C1 (FIG. 1) and C2 (FIG. 2), using non-acidified glycerine, the propylene oxide pressure began to rise almost immediately following the beginning of glycerine addition. In Comparative Example C1, a pressure of 48 psia was reached about five hours after glycerine addition was begun, indicating that catalyst was deactivated. In Comparative Example C2, the propylene oxide pressure reached 43 psia, again indicating that the catalyst had been deactivated. The oxide feed was stopped and the catalyst eventually consumed the oxide. The oxide feed in Comparative Example C2 was reinitiated and oxide pressure rapidly reached 33 psia after only 30 minutes at which point the run was aborted due to catalyst deactivation.

In Examples 1, 2 and 3, the glycerine was acidified prior to being co-fed to the reactor. Note that the propylene oxide pressure remained constant within approximately 5 psia for the bulk of the reaction. The Figures illustrate the dramatic improvement made available by acidifying the glycerine feed. Note that the small jag in the plot occurring at about three and one-half hours into the reaction represents contact of the second reactor impeller with the reactor contents, increasing the level of agitation.

In addition to these dramatic differences in the respective acidified and non-acidified process, the polyols themselves are also significantly different when the glycerine feed is acidified. The Example 1 polyol (acidified glycerine feed) had a polydispersity ($M_w/M_n$) of only 1.11 and about 444 ppm (average of two measurements) high molecular weight tail. The hydroxyl number was 54.7, and the unsaturation typical of that generated employing highly active DMC catalysts at about 0.0037 meq/g. The polyol in Example 1 passes the critical foam test with acceptable foam settle.

By contrast, in the non-acidified Comparative Example C1, results are quite different. In Comparative Example C1, the catalyst deactivation is so severe that the desired molecular weight could not be achieved, as reflected by the high hydroxyl number of 68.2. Even at this lower molecular weight as reflected by the high hydroxyl number, polydispersity was very high, at 1.75. Significantly, the amount of high molecular weight tail is greater than the level of Example 1, at about 573 ppm (average), a c.a. 30% increase. Further, the polyol fails the critical foam test, exhibiting excessive foam settling.

The Example 2 and 3 polyols (acidified glycerine feed) are near duplicates in properties. Examples 2 and 3 had polydispersities ($M_w/M_n$) of only 1.12 and viscosities from 651–665 cst. The hydroxyl number for Example 2 was 51.3 and the hydroxyl number for Example 3 was 49.9 compared to the specified 52.0 hydroxyl number target. The unsaturation for Examples 2 and 3 were again typical of levels of unsaturation generated when using highly active DMC catalysts, at c.a. 0.0026–0.0029 meq/g.

By contrast, in the non-acidified Comparative Example C2, results are quite different. In Comparative Example C2, the catalyst deactivation is so severe that the desired molecular weight could not be achieved, as reflected by the high hydroxyl number of 67.0. Even at the lower molecular weight, polydispersity was high, 1.31. The viscosity of Comparative Example C2 was lower for the lower molecular weight polyol as compared to Examples 2 and 3.

The examples and comparative examples discussed above indicate that acidification of the glycerine feed creates an enormous difference in DMC catalyzed glycerine oxyalkylation employing continuous addition of low molecular weight starter. Both the amount of high molecular weight tail as well as the polydispersity are lowered considerably, and catalyst deactivation is substantially prevented. It should again be noted that the contribution of the high molecular weight tail to the total polydispersity is very minimal. The greatest part of the difference in polydispersity between Example 1 and Comparative Example C1 is related to the distribution of molecules in the lower molecular weight range, i.e., in the neighborhood of the number average target weight of c.a. 3000 Da.

While the subject process has been described relative to glycerine per se, it is also applicable to other low molecular weight starters which are synthesized, treated, or stored such that basic impurities which can cause DMC catalyst deactivation are present in the polyol, preferably starters having molecular weights below 300 Da, more preferably below 200 Da. One non-limiting example is diglycerol. Identity of such "acid sensitive" starters can be performed as previously indicated.

The term "establishing oxyalkylation conditions" in an oxyalkylation reactor is believed to be self-explanatory. Such conditions are established when the reactor temperature, alkylene oxide pressure, catalyst level, degree of catalyst activation, presence of oxyalkylatable compounds within the reactor, etc., are such that upon addition of unreacted alkylene oxide to the reactor, oxyalkylation takes place. As a non-limiting example, in the batch version of continuous addition of starter, oxyalkylation conditions are initially established by following the procedures detailed in the preceding examples. By the term "continuously introducing" with respect to addition of alkylene oxide and low molecular weight starter is meant truly continuous, or an incremental addition which provides substantially the same results as continuous addition of these components. By the term "oxyalkylated low molecular weight starter polyether" is meant a polyoxyalkylene polyether prepared by oxyalkylating the acid sensitive low molecular weight starter or a starter mixture containing the acid sensitive low molecular weight starter. For example, when the acid sensitive low molecular weight starter is glycerine, the oxyalkylated low molecular weight starter polyether will be a polyoxypropylated, glycerine-initiated triol. The terms "starter" and "initiator" as used herein are the same unless otherwise indicated.

Having now fully described the invention, it will be apparent to one of ordinary skill in the art that many changes and modifications can be made thereto without departing from the spirit or scope of the invention as set forth herein.

What is claimed is:

1. A process for the reproducible direct polyoxyalkylation of an acid sensitive lower molecular weight starter in the presence of a double metal cyanide complex catalyst, said processing comprising:

a) establishing oxyalkylation conditions in an oxyalkylation reactor in the presence of a double metal cyanide catalyst;

b) continuously introducing alkylene oxide and acid sensitive low molecular weight starter to said reactor; and c) recovering an oxyalkylated low molecular weight starter polyether product;

wherein deactivation of double metal cyanide catalyst is decreased by one or more of the steps of:

i) acidifying said acid sensitive low molecular weight starter prior to introducing said acid sensitive low molecular weight starter into said reactor;

ii) treating said acid sensitive low molecular weight starter with an effective amount of a base-reactive or base-absorptive substance other than an acid prior to introducing said acid sensitive low molecular weight starter into said reactor;

iii) adding an effective catalyst deactivation preventing amount of an acid to said reactor, said effective catalyst deactivation preventing amount of acid not contained in a feed stream containing acid sensitive low molecular weight starter, wherein said acid is an inorganic protic mineral acid or an organic acid.

2. The process of claim 1 wherein said acid sensitive low molecular weight starter comprises glycerine, said glycerine acidified by addition of an effective catalyst deactivation preventing amount of one or more acids selected from organic and inorganic acids to said glycerine.

3. The process of claim 2 wherein said one or more acids comprise an inorganic acid present in an amount of from about 1 ppm to about 100 ppm based on the weight of glycerine.

4. The process of claim 2 wherein said acid comprises phosphoric acid in an amount of from about 5 ppm to about 100 ppm based on the weight of glycerine.

5. The process of claim 1 wherein the acid added to said reactor in step iii) comprises one or more acids selected from organic acids and inorganic acids, in an amount of from about 1 ppm to about 100 ppm based on the weight of acid sensitive low molecular weight starter to be continuously introduced into said reactor.

6. The process of claim 1 wherein said acid is phosphoric acid and said phosphoric acid is added to a heel in said reactor in an amount of from about 5 ppm to about 100 ppm based on the weight of acid sensitive low molecular weight starter to be continuously added to said reactor.

7. The process of claim 1 wherein said step of continuously introducing glycerine is accompanied by introducing at least one additional oxyalkylatable starter molecule other than glycerine into said reactor.

8. The process of claim 1 wherein said reactor is a continuous reactor.

9. The process of claim 8 wherein said continuous reactor comprises a tubular reactor.

10. The process of claim 9 wherein said step of continuously introducing alkylene oxide and acid-sensitive starter comprises multi-point addition.

11. The process of claim 10 wherein said alkylene acid-sensitive starter is contained in said alkylene oxide as a mixed reactor feed stream.

12. A process for the reproducible direct oxyalkylation of an acid sensitive low molecular weight starter in the presence of a double metal cyanide complex catalyst, comprising:

a) establishing oxyalkylation conditions in an oxyalkylation reactor in the presence of a double metal cyanide oxyalkylation catalyst and a polyoxyalkylene polyether heel;

b) continuously introducing acid sensitive low molecular weight starter and alkylene oxide into said reactor;

c) recovering a further oxyalkylated acid sensitive low molecular weight starter product, wherein an effective catalyst deactivation preventing amount of a protic mineral acid or an organic acid is added to said reactor, to said acid sensitive low molecular weight starter, or to both said reactor and said acid sensitive low molecular weight starter such that catalyst deactivation is decreased.

13. The process of claim 12 wherein said acid comprises an inorganic acid and said inorganic acid is added to said acid sensitive low molecular weight starter in an amount of from about 1 ppm to about 100 ppm based on the weight of the acid sensitive low molecular weight starter.

14. The process of claim 13 wherein said inorganic acid comprises phosphoric acid in an amount of from about 5 ppm to about 100 ppm based on the weight of said acid sensitive low molecular weight starter.

15. The process of claim 12 wherein said acid is an inorganic acid and is added to said heel prior to said continuously introducing said acid sensitive low molecular weight starter.

16. The process of claim 15 wherein said inorganic acid is added in an amount of from about 1 ppm to about 100 ppm based on the amount of acid sensitive low molecular weight starter to be continuously introduced into said reactor.

17. The process of claim 12 wherein said acid is introduced into said reactor in a stream separate from said acid sensitive low molecular weight starter and separate from said heel.

18. The process of claim 12 wherein said oxyalkylation reactor is a continuous oxyalkylation reactor and wherein said heel is provided by recycle of a takeoff stream from said reactor.

19. The process of claim 12 wherein said acid sensitive low molecular weight starter comprises glycerine.

20. The process of claim 13 wherein said acid sensitive low molecular weight starter comprises glycerine.

21. The process of claim 15 wherein said acid sensitive low molecular weight starter comprises glycerine.

22. The process of claim 18 wherein said acid sensitive low molecular weight starter comprises glycerine.

23. The process of claim 12 wherein said reactor is a continuous reactor.

24. The process of claim 23 wherein said reactor is a turbular reactor.

25. The process of claim 24 wherein said step of continuously introducing alkylene oxide and acid-sensitive starter comprises multi-point addition.

26. The process of claim 25 wherein said alkylene acid-sensitive starter is contained in said alkylene oxide as a mixed reactor feed stream.

27. A process for the direct polyoxyalkylation of glycerine in the presence of a double metal cyanide complex catalyst, said process comprising:

a) establishing oxyalkylation conditions in an oxyalkylation reactor in the presence of a double metal cyanide catalyst;

b) continuously introducing alkylene oxide and glycerine to said reactor; and c) recovering an oxyalkylated glycerine polyether product;

wherein deactivation of double metal cyanide catalyst is decreased by one or more of the steps of:

i) acidifying said glycerine prior to introducing said glycerine into said reactor;

ii) treating said glycerine with an effective amount of a base-reactive or base-absorptive substance prior to introducing said glycerine into said reactor; and iii) adding an effective catalyst deactivation preventing amount of an acid to said reactor.

* * * * *